United States Patent
Stout

(10) Patent No.: US 6,640,500 B1
(45) Date of Patent: *Nov. 4, 2003

(54) MODULAR DOOR IN WHICH A WINDOW LIFT FORMS THE STRUCTURAL FRAME FOR THE TRIM PANEL

(75) Inventor: Jeffrey T. Stout, Grandville, MI (US)

(73) Assignee: Johnson Controls Technology Company, Plymouth, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 5 days.

(21) Appl. No.: 08/995,695

(22) Filed: Dec. 22, 1997

(51) Int. Cl.$^7$ .................................................. B60J 5/04
(52) U.S. Cl. .......................... 49/502; 49/352; 296/146.7
(58) Field of Search ................. 49/502, 352; 296/146.1, 296/146.6, 147.7, 146.5, 146.7; 52/735.1, 730.1

(56) References Cited

U.S. PATENT DOCUMENTS

| | | | |
|---|---|---|---|
| 2,566,871 A | 9/1951 | Bedford et al. |
| 2,650,857 A | 9/1953 | Watter et al. |
| 2,707,320 A | 5/1955 | Fish |
| 2,791,464 A | 5/1957 | Renno |
| 2,797,127 A | 6/1957 | Renno |
| 2,797,128 A | 6/1957 | Renno |
| 2,797,129 A | 6/1957 | Renno |
| 2,797,130 A | 6/1957 | Renno |
| 3,258,877 A | 7/1966 | Peras |
| 3,782,036 A | 1/1974 | Clark et al. |
| 3,791,693 A | 2/1974 | Hellriegel et al. |
| 4,151,683 A | 5/1979 | Narita et al. |
| 4,306,381 A | 12/1981 | Presto |
| 4,328,642 A | 5/1982 | Presto |
| 4,369,608 A | 1/1983 | Miura et al. |
| 4,411,466 A | 10/1983 | Koike |
| 4,471,251 A | 9/1984 | Yamashita |
| 4,564,232 A | 1/1986 | Fujimori et al. |
| 4,603,894 A | 8/1986 | Osekowski |
| 4,606,148 A | 8/1986 | Gandini |
| 4,608,779 A | 9/1986 | Maeda et al. |
| 4,610,620 A | 9/1986 | Gray |
| 4,648,208 A | 3/1987 | Baldamus et al. |
| 4,651,470 A | 3/1987 | Imura et al. |

(List continued on next page.)

FOREIGN PATENT DOCUMENTS

| | | |
|---|---|---|
| DE | 1955213 | 11/1969 |
| DE | 3530413 | 2/1987 |
| EP | 0170150 | 2/1986 |
| FR | 2416-809 | 10/1979 |
| GB | 1 372 752 | 11/1974 |
| GB | 2 117 329 | 10/1983 |
| GB | 2 149 726 | 6/1985 |
| GB | 2 164 609 | 3/1986 |
| JP | 59-84621 | 5/1984 |
| JP | 2000318532 | 11/2000 |
| WO | 85/05599 | 12/1985 |
| WO | WO 98/42527 | 10/1998 |

Primary Examiner—Gregory J. Strimbu
(74) Attorney, Agent, or Firm—Foley & Lardner

(57) ABSTRACT

A door module employs the window lift structure as a frame or skeleton for providing structural support directly to a relatively thin trim panel. In one embodiment of the invention, the window lift structure includes a Π-shaped skeleton made of a pair of spaced legs extending downwardly from an upper horizontally extending reinforcement member to which the relatively thin trim panel is secured. The module is then attached to a vehicle metal door frame and skin in a conventional manner. In another embodiment, the window lift structure has a single arm which extends downwardly from a horizontally extending reinforcement member and a supplemental spaced leg. is provided and coupled to the trim panel to complete the construction.

25 Claims, 4 Drawing Sheets

U.S. PATENT DOCUMENTS

| | | | |
|---|---|---|---|
| 4,662,115 A | | 5/1987 | Ohya et al. |
| 4,691,475 A | * | 9/1987 | Maekawa .................... 49/352 |
| 4,711,052 A | | 12/1987 | Maeda et al. |
| 4,785,585 A | | 11/1988 | Grier et al. |
| 4,827,671 A | | 5/1989 | Herringshaw et al. |
| 4,831,710 A | | 5/1989 | Katoh et al. |
| 4,848,033 A | * | 7/1989 | Sasaki et al. .................. 49/352 |
| 4,848,829 A | | 7/1989 | Kidd |
| 4,876,825 A | * | 10/1989 | Widrig et al. ................. 49/502 |
| 4,882,842 A | | 11/1989 | Basson et al. |
| 4,920,697 A | * | 5/1990 | Vail et al. ..................... 49/348 |
| 4,924,630 A | | 5/1990 | Lomasney et al. |
| 4,974,365 A | * | 12/1990 | Ono ............................. 49/502 |
| 5,033,236 A | * | 7/1991 | Szerdahelyi et al. .......... 49/502 |
| 5,037,687 A | | 8/1991 | Kargarzadeh et al. |
| 5,086,586 A | | 2/1992 | Hlavaty et al. |
| 5,095,659 A | | 3/1992 | Benoit et al. |
| 5,104,596 A | | 4/1992 | Kargarzadeh et al. |
| 5,125,815 A | | 6/1992 | Kargarzadeh et al. |
| 5,173,228 A | | 12/1992 | Kargarzadeh et al. |
| 5,174,066 A | * | 12/1992 | Dupuy ........................ 49/502 |
| 5,226,259 A | | 7/1993 | Yamagata et al. |
| 5,230,855 A | | 7/1993 | Kargarzadeh et al. |
| 5,308,138 A | | 5/1994 | Hlavaty |
| 5,355,629 A | | 10/1994 | Kimura et al. |
| 5,367,832 A | | 11/1994 | Compeau et al. |
| 5,370,831 A | * | 12/1994 | Blair et al. .................. 264/460 |
| 5,379,553 A | | 1/1995 | Kimura et al. |
| 5,425,206 A | | 6/1995 | Compeau et al. |
| 5,433,041 A | | 7/1995 | Filippi |
| 5,469,663 A | | 11/1995 | TenBrink et al. |
| 5,505,024 A | | 4/1996 | DeRees et al. |
| 5,535,553 A | | 7/1996 | Staser et al. |
| 5,548,930 A | | 8/1996 | Morando |
| 5,555,677 A | | 9/1996 | DeRees et al. |
| 5,647,171 A | * | 7/1997 | Wirsing et al. ................ 49/502 |
| 5,762,394 A | | 6/1998 | Salmonowicz et al. |
| 5,855,096 A | | 1/1999 | Staser et al. |
| 5,890,321 A | | 4/1999 | Staser et al. |
| 5,904,002 A | | 5/1999 | Emerling et al. |
| 5,937,584 A | | 8/1999 | Salmonowicz et al. |
| 5,960,588 A | | 10/1999 | Wurm et al. |
| 5,964,063 A | * | 10/1999 | Hisano et al. ................ 49/502 |
| 6,135,778 A | | 10/2000 | Ubelein |
| 6,139,088 A | | 10/2000 | Okamoto et al. |

\* cited by examiner

MODULAR DOOR IN WHICH A WINDOW LIFT FORMS THE STRUCTURAL FRAME FOR THE TRIM PANEL

BACKGROUND OF THE INVENTION

The present invention relates to vehicle doors and particularly to a modular door assembly.

In recent years, efforts have been made to improve the quality of vehicle construction as well as reducing the cost of not only manufacturing the vehicle but the cost of operating the vehicle by reducing the weight of the vehicle and, therefore, the energy required for its use. In the past, door assemblies typically were manufactured utilizing a door frame having an outer metal skin. An inner cover plate to which most of the door mechanisms, including window lift assemblies, locks, hinges and the like, were mounted was then positioned over the door frame and subsequently a trim panel attached to the door. In recent years in order to facilitate assembly and control the quality of vehicle door mechanisms, doors have been manufactured utilizing an outer skin and frame which does not include the control mechanism but separately mounted thereto is a carrier plate with the window lift mechanism, the door latching mechanism and the like mounted thereto. This carrier plate is subsequently inserted into the door, secured thereto and a trim panel subsequently covers the interior surface of the resultant door assembly. Although this construction allows better control of the quality of the mechanism mounted on a separate carrier plate, the resultant structure is still relatively heavy and requires assembly of the carrier plate to the vehicle door during manufacture as well as subsequent assembly of the trim panel to the door.

Yet another approach has been suggested in which a relatively rigid trim panel is employed and includes sufficient reinforcement such that the window lift mechanism, door latching mechanism and the like can be mounted directly to the trim panel, which is finished as a subassembly and attached directly to the outer door member. This construction, thus, provides a two-piece door construction in which the inner trim panel and associated operating hardware, including the window and its control mechanism, the door latch and the like, can be made as a single module and subsequently attached to the door during manufacture. This construction is shown in U.S. patent application Ser. No. 08/760,787, entitled DOOR CONSTRUCTION AND METHOD OF ASSEMBLY, filed Dec. 5, 1996, now abandoned the disclosure of which is incorporated herein by reference. Although this construction provides for the quality control of the various components of the door assembly and reduces the overall cost, the trim panel is still a relatively thick structure requiring the use of somewhat expensive materials. The weight, although reduced from prior constructions requiring carrier plates, is still somewhat heavy.

Thus, there remains a need for a modular door assembly which is both lightweight, modular in construction and, therefore, easy to assemble in the assembly plant and yet relatively inexpensive.

SUMMARY OF THE PRESENT INVENTION

The door module of the present invention satisfies this need by employing the control mechanism for the window lift structure as a frame or skeleton to which a relatively thin trim panel is mounted, thereby eliminating the necessity of thick structural trim panels or carrier plates for the window assembly. By coupling the window assembly structure to a single horizontally extending cross member, sufficient structural rigidity is provided to the door panel which can subsequently be mounted to a conventional door outer skin and frame as a modular unit. In a preferred embodiment of the invention, the door module includes a Π-shaped skeleton made of a pair of window lift arms extending downwardly from an upper horizontally extending reinforcement strut to which a relatively thin trim panel is secured with the combination then being attached to a vehicle metal door frame and skin in a conventional manner. In other embodiments, a single arm window lift assembly extends downwardly from a horizontally extending strut and a supplemental reinforcing arm is provided and coupled to a relatively thin trim panel to complete the construction. Thus, a modular door system of the present invention can be employed with single or dual arm window lift mechanisms and provides an extremely lightweight, relatively inexpensive modular door construction which recognizes and utilizes the structural window lift mechanism itself as its structural support, thereby eliminating additional reinforcing structure.

These and other features, objects and advantages of the present invention will become apparent upon reading the following description thereof together with reference to the accompanying drawings.

DETAILED DESCRIPTION OF THE PREFERRED EMBODIMENT

Figure 1:
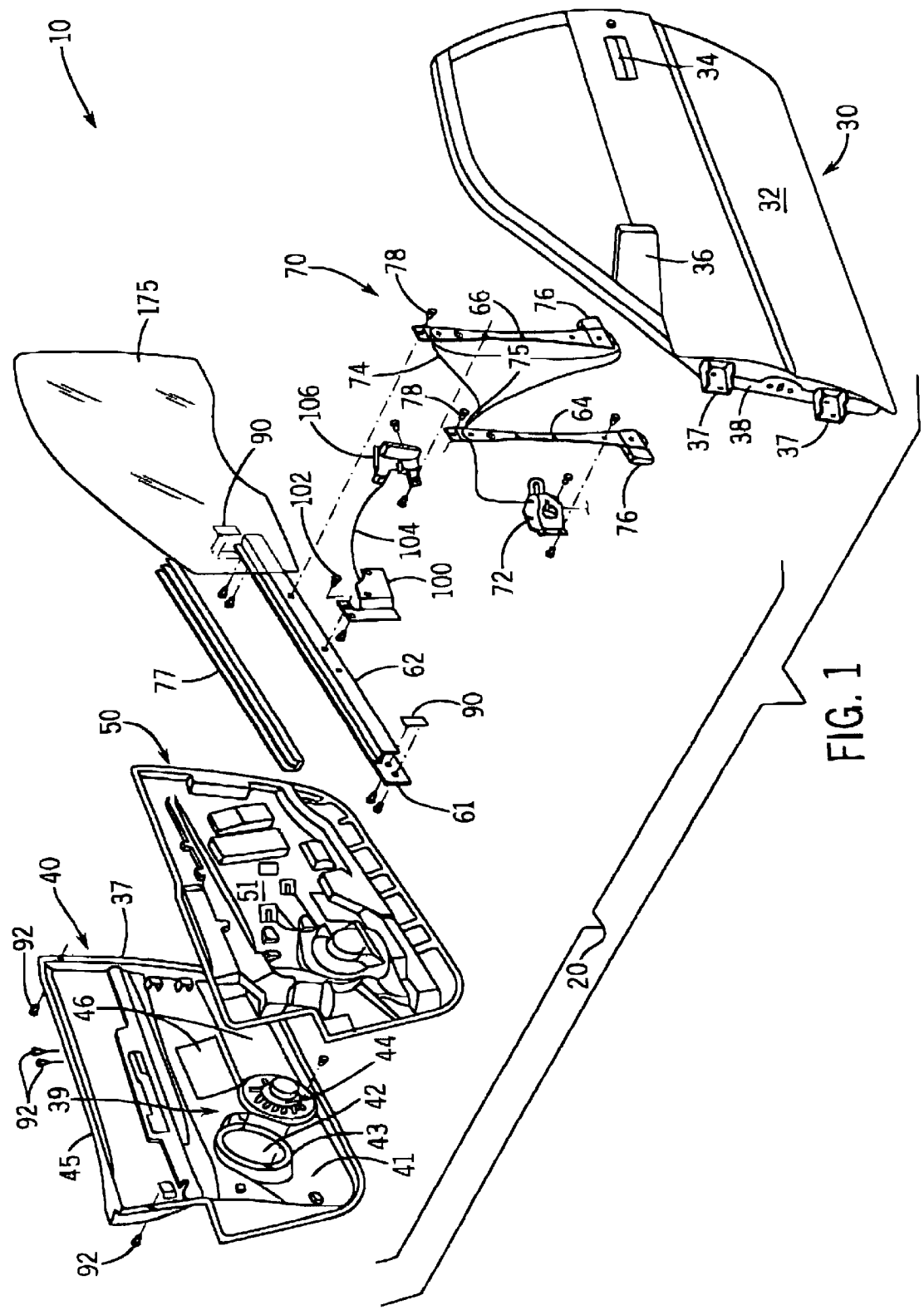
FIG. 1 is an exploded perspective view of a modular door embodying the present invention.

Referring initially to FIG. 1, there is shown a drivers side door assembly 10 embodying the present invention, which includes an inner door module 20 and an outer door assembly 30. The outer door assembly 30 includes an outer door skin 32, a door operating handle 34, a side view mirror 36, a frame 38 surrounding the door, and hinges 37 for securing the door to the vehicle chassis. The outer door assembly 30 typically will also include crush beams and conventional reinforcement within the door panel. Coupled to the outer door assembly 30 is the door module 20 of the present invention which comprises a relatively thin trim panel 40, which may include on its surface facing the vehicle interior an armrest, straps for closing the door and a control panel for receiving electrical switches or the like for controlling an electrically operated window assembly, door locks, the side view mirror 36 and other conventional electrically operated features. The trim panel 40 includes an outer perimeter 37 defining an interior portion 39 with an interior surface 41. The trim panel 40 also includes an aperture 42 with a reinforced bezel 43 for receiving a speaker 44. The panel may additionally include acoustical damping pads 46 mounted to the interior surface 41 of the panel at strategic locations for dampening noise.

Overlying the interior surface 41 of trim panel 40, which is described in greater detail below in connection with FIG.

3, is a water seal panel 50 which, like trim panel 40, is integrally molded and has a shape conforming to that of the trim panel. The trim panel 40 and seal 50 is attached to a Π-shaped framework 60 (FIG. 2) comprising a horizontally extending upper belt-line reinforcement cross member or strut 62 to which there is attached downwardly extending control legs or guide rails 64, 66 of a conventional two-bar cable driven window lift assembly or mechanism 70 (FIG. 1). The strut 62 providing the only support for the legs 64, 66 following "(FIG. 1). " Assembly or mechanism 70 includes a window drive motor 72 and cables 74 extending around pulleys 75 located at the ends of legs 64, 66 for raising and lowering a side window 175 fitted within the window-receiving members 76 of the window lift mechanism 70. The Π-shaped skeleton 60 so formed is secured to the trim panel 40 and seal 50 by means of a plurality of spaced fasteners 80 shown in FIGS. 2 and 3, commonly of the type referred to as "Christmas tree fasteners" as well as some mechanical fasteners, which may be secured to the inner surface 41 of panel 40 as taught by the U.S. Pat. No. 5,876,084, entitled PANEL MOUNTING CLIP, issued Mar. 2, 1999, the disclosure of which is incorporated herein by reference.

Figure 2:
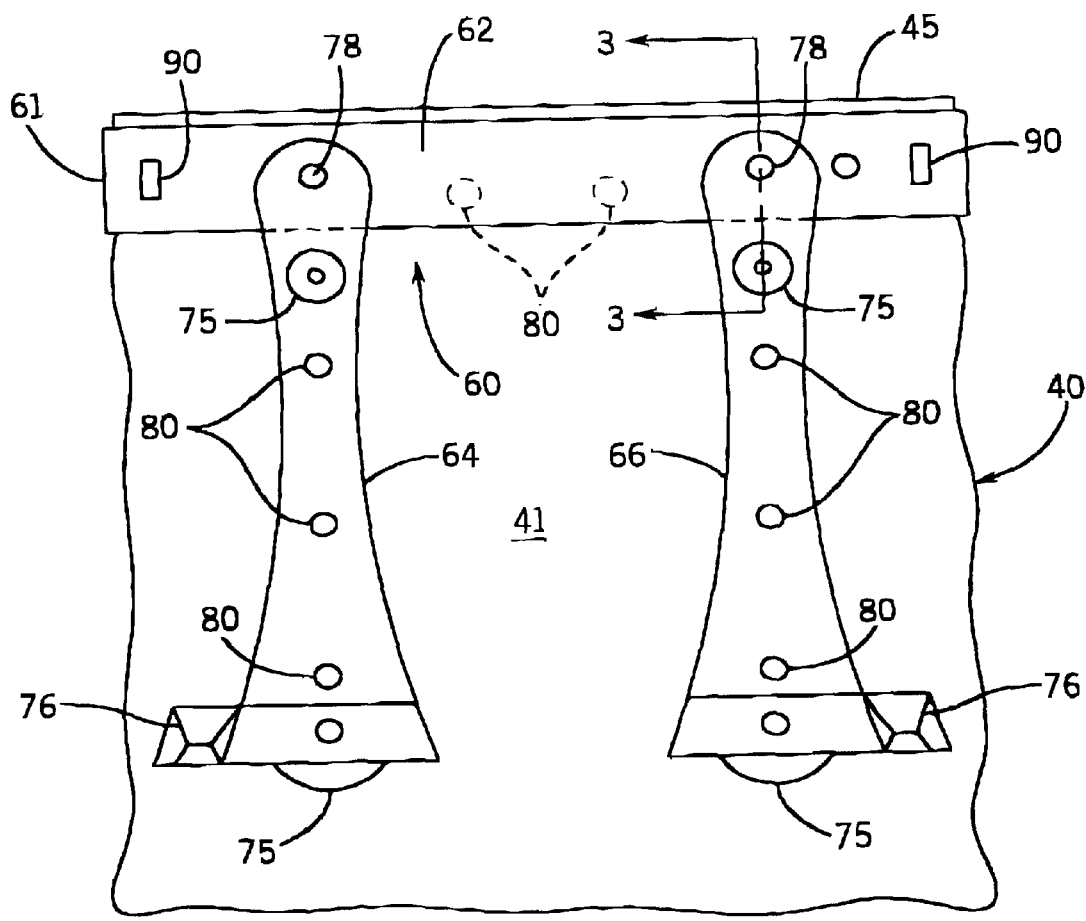
FIG. 2 is an enlarged plan schematic view showing the relationship between the trim panel, window lift struts and cross member shown in FIG. 1.

As seen in FIG. 2, the Π-shaped skeleton 60 formed by cross member 62 and window control legs 64, 66 may be secured to the trim panel 40 at a variety of locations with the upper edge 45 of panel 40 being aligned with a window seal 77 and the cross member 62 being just under the edge 45 of the three-dimensional molded panel 40. The cross member 62 is secured to the legs 64, 66 of the window control assembly 70 by means of fasteners such as rivets 78, while conventional Z-axis snap-in clips 90 are secured to the opposite ends 61 of cross member 62 for snapping the assembly 20 to the frame of door panel assembly 30. Additional fastening screws 92 extend around the periphery of module 20, including trim panel 40, for the assembly of module 20 to door assembly 30 during final assembly. The legs 64, 66 providing direct structural support to an interior portion of the trim panel 40.

The trim panel 40 is molded of a suitable polymeric material, such as polypropylene which is relatively thin having a thickness of from 1.5 to 4 mm and having a textured surface and a color conforming to the interior decor of the vehicle in which the trim panel is to be mounted. In a preferred embodiment of the invention, the thickness of the trim panel 40 was approximately 2.5 mm and had a textured surface with the lower section of the panel in the area of speaker aperture 42 facing the interior including a decorative and protective carpeting adhesively attached to the panel. The water seal 50 is attached to panel 40 utilizing a pressure-sensitive roll-coated adhesive 55 (FIG. 3) applied at a variety of spaced mating locations to assure that the seal 50 is bonded to surface 41 of the trim panel. Seal 50 may comprise a relatively thin, lightweight polyethylene foam having a thickness from 1.5 to 4 mm and, in the preferred embodiment, was a polyethylene foam having a thickness of 2.5 mm. Thus, the overall thickness of the subassembly 20 comprising panels 40 and 50 and framework 60 is, in the preferred embodiment, only 5 mm. With the steel channel-shaped cross member 62 extending along substantially the entire width of the panel 40 and legs 64, 66 spaced approximately one quarter of the way inwardly from the forward and trailing edges of module 20, sufficient rigidity is provided by the window control mechanism itself in combination with cross member 62 to provide a module 20 which carries not only the window lifting assembly 70 but the door latching control 100. Control 100 is also attached to the center area of the cross member 62 by suitable rivets 102 and includes a cable 104 extending to the latch mechanism 106, which is attached to the edge of door assembly 30 during final installation of the module 20 to assembly 30. The window lift assembly 70 is of conventional construction and one which is in commercial use in numerous vehicles, as is the door latch assembly.

Figure 3:
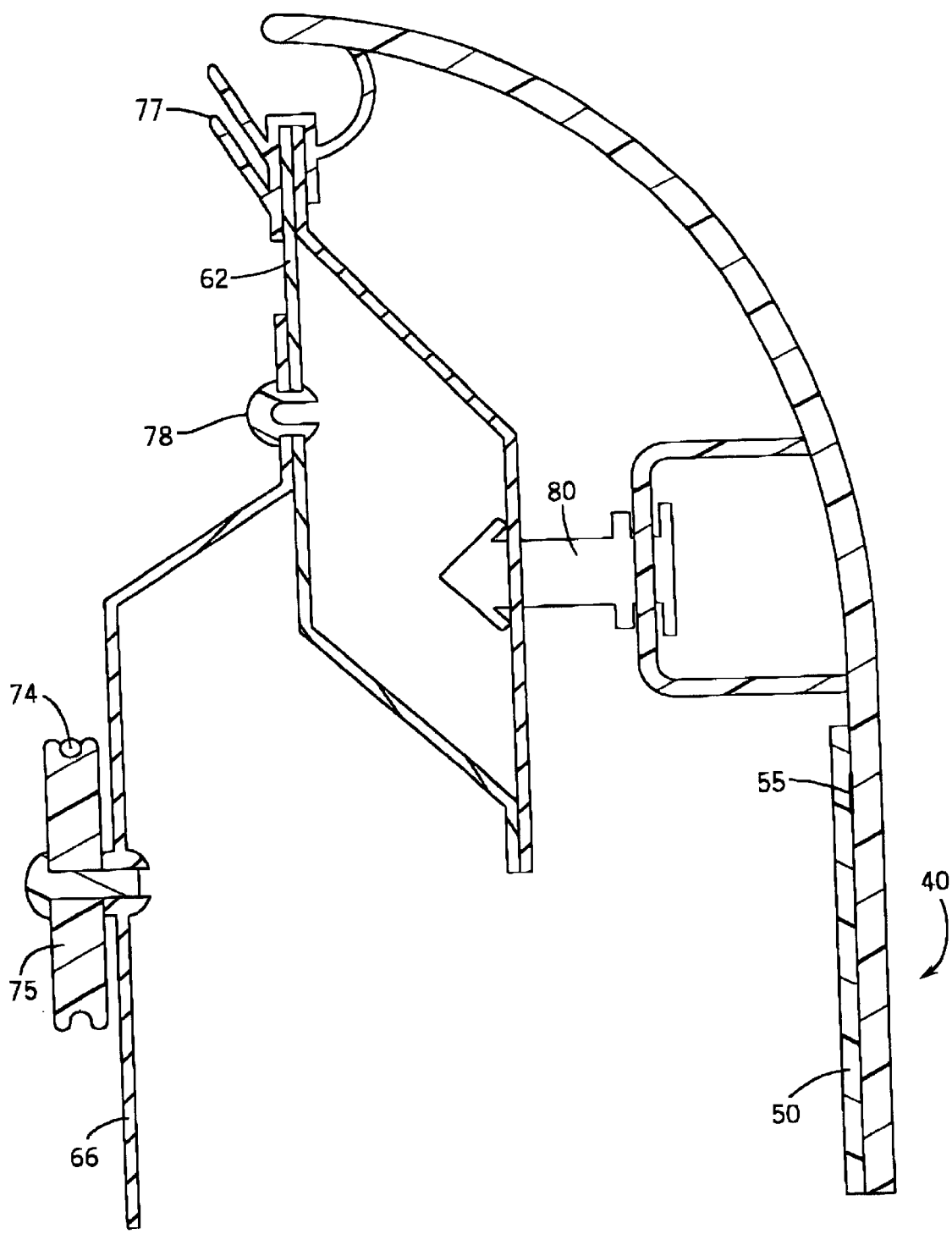
FIG. 3 is a greatly enlarged fragmentary cross-sectional view of the attachment of the trim panel to the cross member, taken along section lines III—III of FIG. 2.
Figure 4:
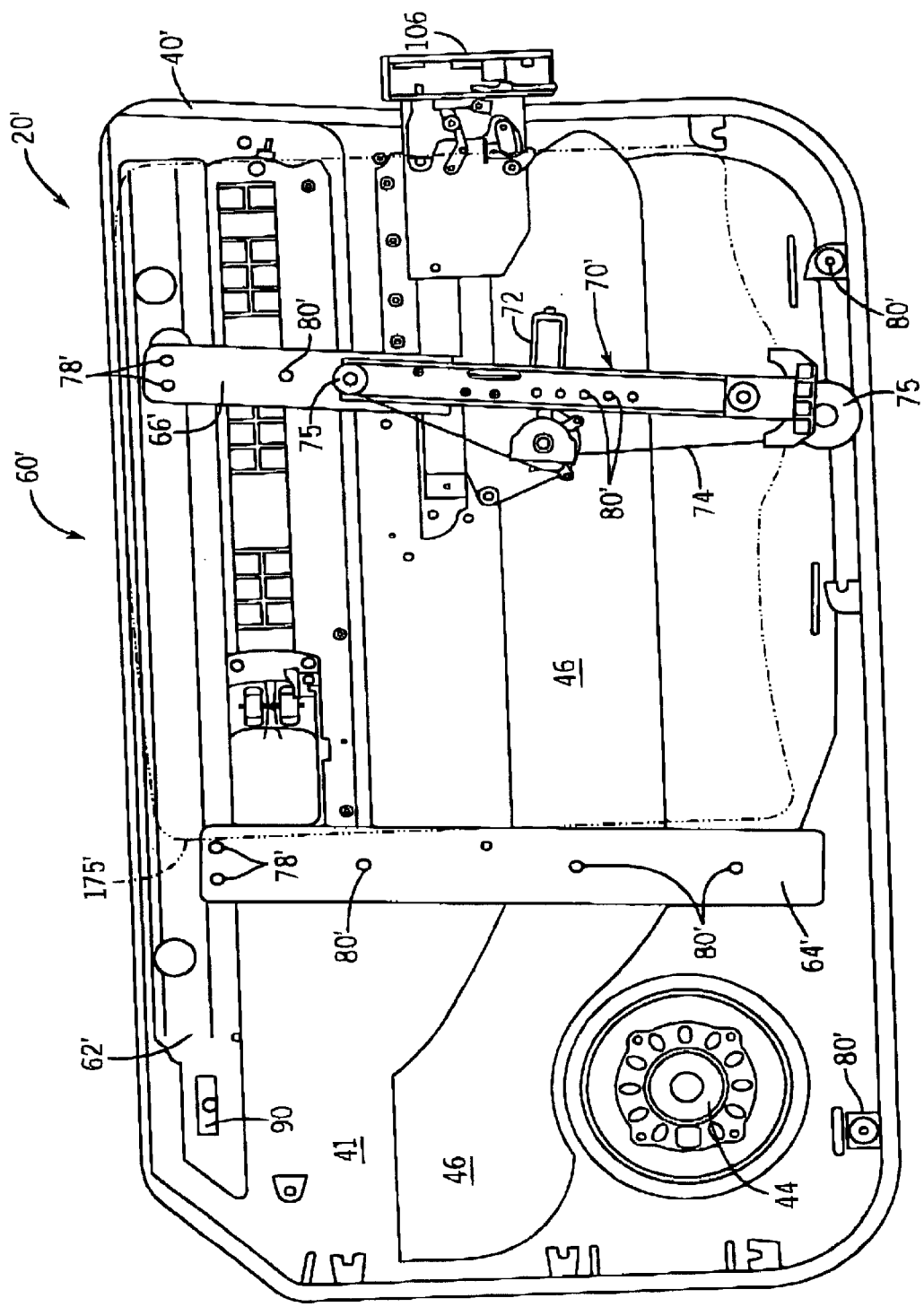
FIG. 4 is a front elevational view of an embodiment of the invention utilizing an alternate window lift.

The concept of using the window control mechanism as the inter framework or skeleton for a relatively thin trim panel can also be employed with a single arm window control assembly 70', as seen in FIG. 4, in which an assembled module 20' is shown including the relatively thin trim panel 40', shown in FIG. 4 without the seal 50 for purposes of illustrating the construction. Similar elements contain the same reference numerals as the embodiment shown in FIG. 1 but with a"'" symbol. The single arm window control mechanism 70' receives a window panel 1751, which is somewhat smaller than that shown in the FIG. 1 embodiment, and is coupled at its upper end to horizontal cross member 62' by rivets 78'. In this embodiment, a supplemental downwardly depending arm 64' is provided to operate in conjunction with the single arm 66' associated with the window lift mechanism 70' to form the Π-shaped framework 60' for the door module 20'. Module 20' can be manufactured in the same manner as shown in connection with the embodiment shown in FIGS. 1–3, with an outer relatively thin trim panel 40' made of 2.5 mm polypropylene to which there is bonded a seal (not shown) of the same construction as seal 50. Panel 40' is attached to the cross member 62', legs 64' and window control 70' utilizing a plurality of Christmas tree fasteners and mechanical attachments 80' as in the first embodiment.

Thus, a relatively thin trim panel is employed in both embodiments and which significantly reduces the weight and expense of the overall assembly. The Π-shaped frames 60, 60' are of relatively thin construction, as shown in FIG. 3, employing a conventional window lift mechanism as part of the interior framework for rigidifying the door module. The Π-shaped frames so formed can be stamped, rolled, die cast or extruded steel or other structural material members treated against rust for the automotive environment and will typically include integrally formed, longitudinally extending reinforcing ridges and edges. The benefits of the present invention can also be achieved in a door panel using a thicker trim panel if desired. The present invention, therefore, provides a unique modular door construction in which relatively thin lightweight and inexpensive trim panels can be integrated with the window lift mechanisms to form a structurally rigid subassembly for attachment directly to an exterior door without requiring the use of carrier plates or other structural reinforcing members. The construction can be employed for a variety of window controls which are coupled to a horizontally extending cross member or strut spaced near the upper edge of the door panel to provide the desired rigidity to the subassembly prior to final assembly at the manufacturing plant.

It will become apparent to those skilled in the art that various modifications to the preferred embodiment of the invention as described herein can be made without departing from the spirit or scope of the invention as defined by the appended claims.

What is claimed is:

1. A modular door assembly for coupling to a window and an outer door frame and skin of a vehicle door, the modular door assembly comprising:

an interior trim panel molded of a polymeric material and having a perimeter defining an interior portion; and a window lift assembly including a frame having a horizontal member and a pair of members depending from said horizontal member and providing structural support directly to the interior portion of the interior trim panel, wherein each of said depending members is only supported by said horizontal member, wherein at least one of said depending members comprises a guide rail for movably guiding the window as the window moves between open and closed positions and wherein one of said depending members is spaced inwardly from a side edge of said trim panel closest to said one of said depending members a distance at least one fourth the overall length of said trim panel.

2. The modular door assembly as defined in claim 1 wherein the frame is generally Π-shaped.

3. The modular door assembly as defined in claim 1 wherein the window lift assembly comprises a window drive motor operable to raise and lower the window.

4. The modular door assembly as defined in claim 1 and further including a seal conforming to a shape of the trim panel and is bonded to the trim panel.

5. The modular door assembly as defined in claim 4 wherein the trim panel is about 2.5 mm thick and is molded of polypropylene.

6. The modular door assembly as defined in claim 4 wherein the seal is about 2.5 mm thick and is molded of a polyethylene foam.

7. The modular door assembly as defined in claim 1 wherein the trim panel includes a plurality of fasteners thereon for attaching the trim panel to the frame.

8. A modular door assembly for coupling to a window and a vehicle door, the modular door assembly comprising:
an interior trim panel including a seal;
a Π-shaped frame connected to the trim panel and comprising a cross member and a pair of legs extending generally downwardly from near opposite ends of the cross member, the pair of legs providing rigid structural reinforcement directly to an interior portion of the interior trim panel;
a window lift mechanism mounted on at least one of the pair of legs and operable to raise and lower the window, wherein each of said legs is only supported by said cross member and wherein one of said legs is spaced inwardly from a side edge of said trim panel closest to said one of said legs a distance at least one fourth the overall length of said trim panel.

9. The modular door assembly as defined in claim 8 wherein the pair of legs provide said rigid structural reinforcement directly to the interior trim panel without including a carrier plate.

10. The modular door assembly as defined in claim 8 wherein the interior trim panel is coupled to the pair of legs.

11. The modular door assembly as defined in claim 8 wherein the seal conforms to a shape of the trim panel and is attached to the trim panel.

12. The modular door assembly as defined in claim 11 wherein the trim panel is about 2.5 mm thick and is molded of polypropylene.

13. The modular door assembly as defined in claim 12 wherein the seal is about 2.5 mm thick and is molded of a polyethylene foam.

14. The modular door assembly as defined in claim 13 wherein the trim panel includes a plurality of fasteners attaching the trim panel to the Π-shaped frame.

15. The modular door assembly as defined in claim 14 wherein the cross member is made of steel.

16. A modular door assembly for coupling to a window, the modular door assembly comprising:
a trim panel molded of a polymeric material and including an outer perimeter defining an interior portion;
a window lift assembly coupled to the trim panel, the window lift assembly including:
a frame attached to the trim panel and including a cross member and a first leg and a second leg each of said legs extending generally downwardly from a respective end portion of the cross member, and
a lift mechanism mounted on the first leg and operable to raise and lower the window;
wherein the first leg provides structural reinforcement directly to the interior portion of the trim panel;
wherein each of said first and second legs is only supported by said cross member; and
wherein one of said legs is spaced inwardly from an edge of said trim panel closest to said one of said legs a distance at least one fourth the overall length of said trim panel.

17. The modular door assembly as defined in claim 16 wherein the second leg provides structural reinforcement directly to the interior portion of the trim panel.

18. The modular door assembly as defined in claim 16 wherein the frame is generally Π-shaped.

19. The modular door assembly as defined in claim 16 wherein the lift mechanism comprises a single arm window control assembly.

20. The modular door assembly as defined in claim 16 and further including a seal conforming to a shape of the trim panel.

21. The modular door assembly as defined in claim 20 wherein the trim panel is about 2.5 mm thick and is molded of polypropylene.

22. The modular door assembly as defined in claim 21 wherein the seal is about 2.5 mm thick and is molded of a polyethylene foam.

23. The modular door assembly as defined in claim 22 wherein the trim panel includes a plurality of fasteners secured to an inner surface of the trim panel for attaching the trim panel to the frame.

24. The modular door assembly as defined in claim 16 further comprising a plurality of fasteners for attaching the trim panel to the first leg.

25. The modular door assembly as defined in claim 24 wherein the second leg is coupled to the trim panel.

* * * * *